United States Patent [19]

Gasparian

[11] 4,373,775
[45] Feb. 15, 1983

[54] FIBER DICHROIC COUPLER

[75] Inventor: George A. Gasparian, Roanoke, Va.

[73] Assignee: International Telephone and Telegraph Corporation, New York, N.Y.

[21] Appl. No.: 159,972

[22] Filed: Jun. 23, 1980

[51] Int. Cl.$^3$ .............................................. G02B 5/172
[52] U.S. Cl. ................................ 350/96.15; 350/96.16
[58] Field of Search ............... 350/96.15, 96.16, 96.17, 350/397, 398, 154, 96.21, 97, 96.1, 96.11, 96.12, 96.3; 252/582, 584, 585; 250/227

[56] References Cited

U.S. PATENT DOCUMENTS 3,767,290  10/1973  Lang et al. ............................ 350/397

Primary Examiner—Marvin L. Nussbaum
Attorney, Agent, or Firm—John T. O'Halloran; Peter C. Van Der Sluys

[57] ABSTRACT

An assembly for a bidirectional wavelength dependent beam splitter is disclosed together with a method of fabricating a thin film dichroic element. A dichroic material is applied to the surface of a suitable substrate. The substrate with this applied coating is then immersed in a solvent bath such that the dichroic thin film is either lifted off the substrate or the substrate is dissolved in the solvent bath, thus leaving an extremely thin film comprising the dichroic coating. The dichroic coating is positioned over the end face of a polished fiber beam splitter half and secured thereto by a thin layer of an optical grade epoxy. In the beam splitter configuration, a second polished fiber is secured in a similar manner to the opposite side of the thin film to form a beam splitter structure and hence, to provide a bidirectional wavelength dependent optical coupling device.

21 Claims, 2 Drawing Figures

FIBER DICHROIC COUPLER

BACKGROUND OF THE INVENTION

This invention relates to wavelength dependent optical couplers useful in bidirectional signal transmission with optical fibers and more particularly to a method of providing a dichroic element for such a coupler.

Generally, an optical beam splitter or coupler operates to divide an incident beam of light into two beams for application to two circuits. Such devices are employed in wavelength duplexing in fiber optic communications systems to increase information capacity, provide security among different communications channels and in general, in accomplishing bidirectional transmission over a single fiber.

Dichroic filters have been employed with such fibers to distinguish between or separate two optical wavelengths. According to present technology, dichroic transmission and reflection properties are achieved using multilayer dielectric coatings. Hence, by the use of suitable dielectric coatings or layers, one can achieve dichroic reflectors with both transmission and reflection properties being highly dependent upon both wavelength and polarization. Such dichroic filters operate to selectively reflect and transmit light as a function of wavelength and relatively independent of the plane of vibration.

Typical materials which may be deposited or evaporated on substrates to provide dichroic filters include zinc sulfide, titanium dioxide, magnesium flouride and other materials as well.

The problems of coatings including dichroic layers with optical devices as beam splitters and couplers has been investigated by the prior art. In my copending patent application entitled BIDIRECTIONAL COUPLER FOR COMMUNICATION OVER A SINGLE FIBER, Ser. No. 136,636, filed on Apr. 2, 1980 and assigned to the Assignee herein, many problems concerning dichroic coatings have been explained and characterized. In view of such problems, the above described copending application attempts to circumvent such problems by providing a bulk surface device which is desirably extremely thin, as between fifty to seventy-five micrometers. To provide a dichroic filter of such dimensions, a glass substrate fabricated from an optical quality glass as a fused silica SiO2 is provided having an initial thickness of about one hundred twenty-five to one hundred fifty micrometers.

A multilayer dielectric dichroic coating is applied to one of the large surface areas of the glass substrate. The dichroic coating is a hot coating to provide increased adhesion and durability. After deposition of the coating, the dichroic filter is ground and polished to a nominal thickness. In such an operation, the dichroic surface is protected by applying a soluble adhesive to the dichroic coating, while grinding and polishing the glass. The composite structure is then diced into either square or rectangular wafers by means of a diamond saw. The size of the wafer is variable, but is larger than the fiber to which it is to be ultimately applied. A nominal cross section of two millimeters by two millimeters can be employed. The composite dichroic filter is positioned over a polished fiber beam splitter half. A thin layer of less than twenty-five micrometers of optical epoxy is applied to the fiber beam splitter half and the dichroic wafer is directly attached by means of the epoxy to the half. In such configurations, it is important that the epoxy layer be quite thin such that axial displacement is small to achieve a minimum coupling loss.

As indicated, the above noted patent application describes a beam splitter device including methods for applying a dichroic wafer to an optical fiber. In any event, it is a prime desire in formulating such optical devices to reduce the axial displacement between coupler halves. By reducing axial displacement, one is enabled to achieve an increase in the transmission coupling efficiency.

As indicated, the prior art technique requires the use of a high quality glass substrate upon which the dichroic coating is deposited. The glass substrate has a relatively high index of refraction and is relatively expensive. It is, of course, understood that the above described dichroic filter is a composite device as including a dichroic layer deposited upon a glass substrate.

It is an object of the present invention to entirely eliminate the glass substrate and to provide a dichroic coating which is extremely thin as having a thickness of less than thirty micrometers, which dichroic coating is directly applied to the face of a fiber by means of an extremely thin layer of epoxy. Therefore and in accordance with such structure, one achieves a dichroic filter which is extremely thin as containing no glass substrate and which, therefore substantially reduces the axial displacement between coupler halves to obtain an improved transmission coupling efficiency. These advantages are provided together with the further advantages that the methods employed eliminate the need for a high quality glass substrate of relatively stringent optical requirements and hence, as will be described, the methods according to this invention employ inexpensive substrates as part of the formulation process.

SUMMARY OF THE INVENTION

A thin dichroic coating is evaporated or otherwise deposited on a suitable substrate material. The coating constitutes a multilayer dielectric coating fabricated from suitable dielectrics exhibiting dichroic properties. The substrate is diced into small wafers to allow easy handling and assembly. After the dicing operation, an individual wafer is submerged into a suitable solvent such that the dichroic coating is lifted off the substrate or alternatively, the substrate is dissolved leaving a dichroic thin film. The thin film, which has a thickness of less than thirty micrometers, is then epoxied to a fiber beam splitter half to provide a fiber dichroic coupler half. A second beam splitter half is actively micropositioned and epoxied to the coated coupler half to provide a full dichroic beam splitter. The resultant structure exhibits improved transmission coupling efficiency due to the use of the thin film dichroic, which substantially reduces axial displacement between coupler halves. The technique completely eliminates a high quality and expensive glass substrate, while eliminating time consuming steps necessary in prior art fabrication techniques.

DETAILED DESCRIPTION OF THE INVENTION

Figure 1:
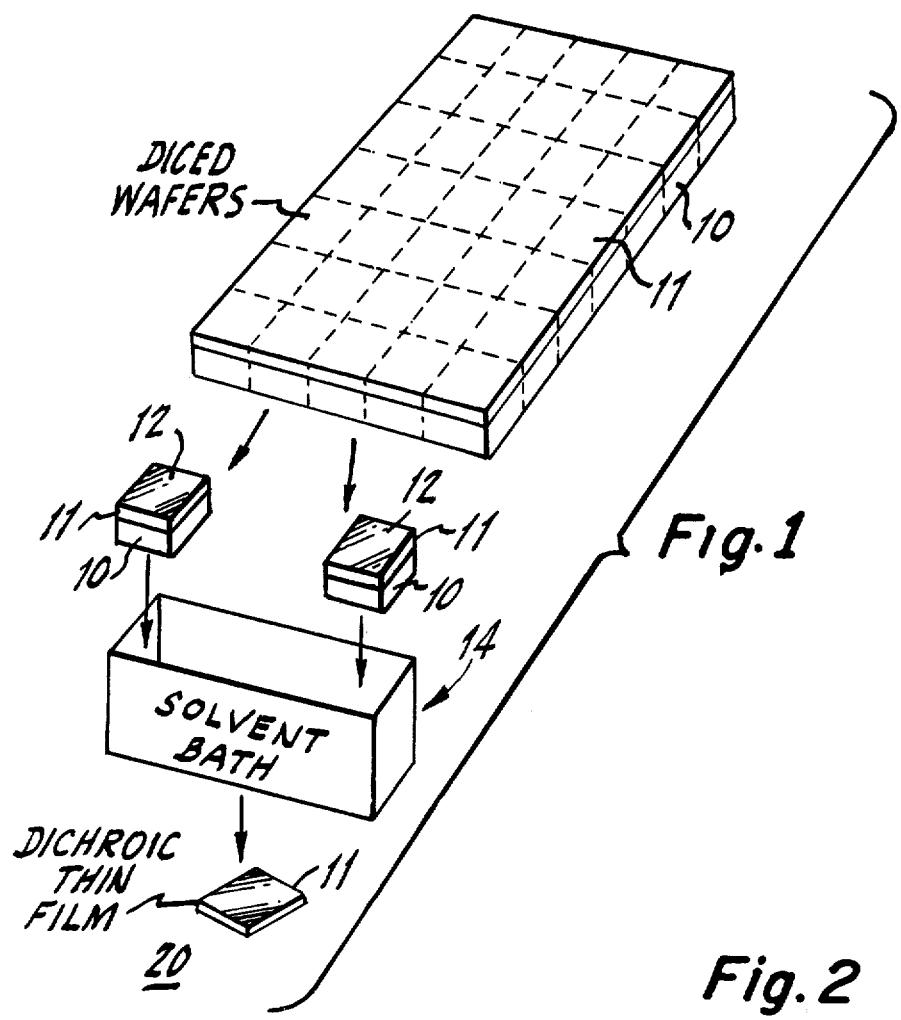
FIG. 1 is a perspective view depicting a substrate having a multilayer dielectric dichroic coating thereon and further specifying steps employed in a method of providing a thin dichroic element and FIG. 2 is a sectional elevational view of a thin film dichroic filter secured in a beam splitter assembly.

Referring to FIG. 1, there is shown a substrate 10. The substrate 10, as will be explained, is fabricated from any type of glass or may, in fact, be fabricated from a suitable crystalline material such as sodium chloride. The surface of the substrate 10 is polished to a relatively good optical finish prior to evaporating or otherwise depositing on the polished surface a dichroic coating 11. The substrate 10 may be in the form of a rectangular slab as shown in the FIG. or may take any other forms. The dichroic coating 11, which consists of a multilayer dielectric material, is applied as a hot coating to enhance adhesion and durability.

As indicated, the substrate 10 may be formed of ordinary glass or formed from a suitable crystalline material, as common salt. Various other crystalline materials are available, which materials are capable of being polished and further capable of having applied to their surfaces, dielectric coatings by utilizing well known procedures for the deposition of dielectrics such as evaporation, sputtering and so on. The dichroic coating 11, as will be explained, is removed or lifted off, thus leaving the dichroic coating 11, which dichroic coating is applied directly to the end face of an optical fiber by means of a suitable optical epoxy.

After deposition of the dichroic coating 11 on the surface of the substrate 10, the substrate is diced into small wafers, nominally about one millimeter by one millimeter. The wafer may be conventionally cut by means of a diamond saw or by utilizing some other convenient process, such as scribing and so on. The dimensions of one by one millimeter, as indicated, are nominal and other sizes can be employed as well.

After dicing the wafer as shown in FIG. 1, a plurality of smaller wafers as 12 are thus provided. The wafers 12 are then submerged into a solvent bath such that the dichroic thin film is lifted off the substrate without damaging the dichroic coating. The solvent employed in the substrate bath 14 is chosen such that only the coating is loosened from the substrate. If glass is employed for the substrate 10, the solvent consists of a solution of methyl alcohol/acetone. This solution serves to separate the multilayer dielectric coating 11 from the glass substrate.

As indicated, if the substrate is sodium chloride, it is, of course, capable of easily dissolving in ordinary water. As is well known, sodium chloride, also known as table salt, rock salt or sea salt occurs in nature as the mineral halite. It can thus be polished as desired. The solvent bath for a sodium chloride substrate would be ordinary water. As is known, one gram of salt dissolves in 2.8 ml of water at 25°. Salt will also dissolve in such solvents as glycerol, while it is slightly soluble in alcohol.

Thus, by removing the dichroic coating in the solvent bath, one obtains a pure dichroic layer, which layer is completely free of substrate and appears as a thin film dichroic coating of a nominal thickness of less than thirty micrometers and depicted in FIG. 1 as 20.

Figure 2:
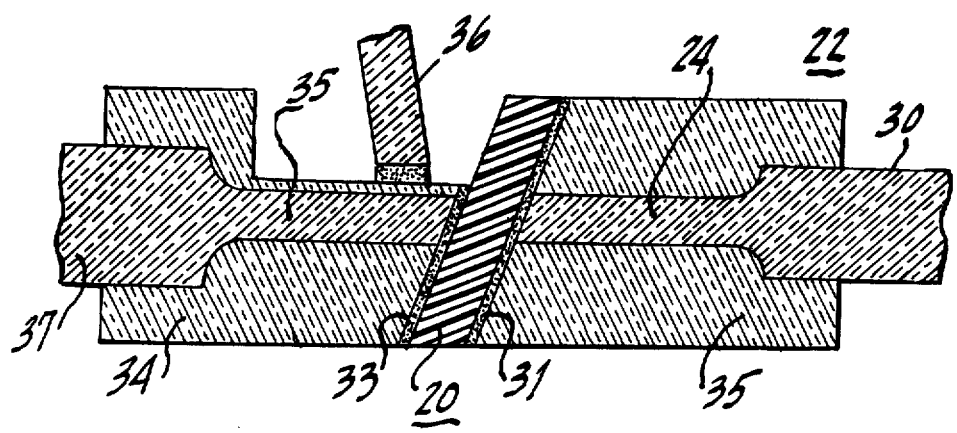

Referring to FIG. 2, the coating or the thin dichroic film is then epoxied to the end face of a polished optical fiber 24 arranged in a beam splitter configuration. The fiber beam splitter half 22 includes a portion including a bare optical fiber section 24 and another portion 30 including the fiber with a jacket of a suitable material. A thin layer 31 of an optical grade epoxy is applied to the end face of the fiber 22 beam splitter half. This layer of epoxy is typically less than twenty-five micrometers in thickness to minimize coupler transmission loss due to the axial separation of the fibers. Hence, the dichroic thin film 20 is directly attached to the fiber beam splitter half by the layer 31 of epoxy.

In the embodiment shown in FIG. 2, the wafer forms an accurate angle with a plane perpendicular to the axis of the beam splitter half of about twenty-five degrees. This angle is critical for optimum optical performance of the fiber dichroic coupler. The angle of twenty-five degrees is selected such that the polarization effects, i.e., Brewster's angle, are not approached (incident acute angle plus finite half angle of the fiber). Brewster's angle for the fiber, core/epoxy interface is about forty-three degrees. The fiber half angle is about eight degrees. Thus a portion of a reflected beam at the dichroic surface will have an angle of about thirty-five degrees. This angle is below the polarization angle to thus enable proper operating characteristics of the dichroic coating.

A second beam splitter half 32 includes an uncoated fiber portion 35 and also a jacketed portion 37. The second beam splitter half 32 is micropositioned with respect to the first fiber beam splitter half 22 to maximize signal through put. It is secured to the opposite side of the dichroic thin film 20 by means of another thin layer 33 of optical grade epoxy. The fiber 32 within the second half has substantially the same diameter as the fiber in the first half and the epoxy layer 33 is of the relatively same dimension as epoxy layer 31.

Additionally, as shown in FIG. 2, a tap off fiber or light pipe 36 is aligned and epoxied to the outer glass substrate 34 which constitutes a glass holding fixture as does member 35 utilized for fiber 24. The tap off fiber or light pipe 36 is aligned and epoxied as shown. Maximum tap off efficiency is achieved and the tap off responds to reflected light emanating from the dichroic surface 20.

The device depicted in FIG. 2 is a didirectional wavelength dependent coupler and hence, light which propagates in either fiber 35 or fiber 24 will be transmitted directly through the dichroic film 20, if such light posseses a first frequency. Light of a second frequency will be reflected at the dichroic surface and hence, be transmitted to the tap off fiber 36.

As one will now ascertain, the thickness of the dichroic film 20 is less than thirty micrometers and hence, is approximately half as thin as prior art dichroic layers. It is therefore understood that the axial separation between fibers 24 and 35 is extremely small as completely determined by the thickness of the film 20 and the epoxy layers 31 and 33. Since the epoxy layers are less than twenty-five micrometers, the entire interface is extremely thin and hence, one achieves optimum transmission coupling efficiency based on the extreme reduction in axial displacement between the coupler halves.

It should be understood that in regard to the above described method, the processing of such dichroic films is extremely simple as compared to prior art techniques. Hence, no other process is required, other than dicing of the bulk wafer. As indicated, the coating is stripped or lifted off by means of a suitable solvent and hence, one does not require high quality expensive substrates in order to produce efficient thin dichroic elements. This technique substantially reduces fabrication time and potential breakage since less handling of the device is required.

One completely eliminates the necessity of polishing a glass substrate containing a prior art dichroic coating. The elimination of the substrate affords another improvement in that the dichroic surface, without a substrate, will not exhibit secondary Fresnel reflection. As is known, such substrates as, for example, the structure depicted in the above noted copending application, can cause Fresnel reflections, which reflections contribute to optical cross talk. In this manner, since one is working with a thin dichroic coating, when the coating is emplaced on the fiber end face, one does not have to worry about orientation of the substrate and hence, the thin film can be positioned on the face of the fiber using either surface.

It should be thus clear to those skilled in the art that the above described method and apparatus results in a substantially improved apparatus, which according to the methods, substantially reduces fabrication time and expense. Those skilled in the art will appreciate that modifications can be made in the above described structure without materially departing from the spirit of the invention. Accordingly, the scope of the invention should be determined by the spirit and scope of the claims appended hereto.

I claim:

1. A method of providing a thin film dichroic element for use in a bidirectional optical coupler, comprising the steps of:
   providing a substrate having a relatively smooth surface,
   applying a dichroic coating upon said smooth surface to provide a composite structure,
   placing said composite structure in a solvent to separate said coating from said substrate to provide a thin film dichroic element,
   attaching said element to an optical fiber by means of an adhesive.

2. The method according to claim 1 wherein
a hot coating of dichroic material is applied to said substrate.

3. The method according to claim 1 wherein
said coating is less than thirty micrometers in thickness.

4. The method according to claim 1 further including
the step of dicing said composite structure into a plurality of smaller structures prior to placing said structure in said solvent.

5. The method according to claim 1 including
the step of providing a second optical fiber and attaching said second optical fiber to a side of said element opposite from where said other optical fiber is attached, both fibers being secured to said element by means of a thin layer of an optical grade epoxy.

6. The method according to claim 1 wherein said substrate is glass.

7. The method according to claim 1 wherein
said substrate is a suitable crystalline material capable of having a dichroic coating applied thereto.

8. The method according to claim 7 wherein
said material is sodium chloride.

9. The method according to claim 8 wherein
said solvent is water operative to dissolve said substrate from said coating and thus to separate said coating from said substrate.

10. The method according to claim 6 wherein
said solvent is a mixture of alcohol and acetone.

11. The method according to claim 1 wherein
said adhesive is an optical grade epoxy of a thickness of less than twenty-five micrometers.

12. The method according to claim 1 wherein
the step of attaching said element to said optical fiber includes attaching said coating at an angle with respect to a plane perpendicular to the axis of said fiber such that polarization effects are not approached.

13. The method according to claim 12 wherein
said angle is about twenty-five degrees.

14. The method according to claim 5 wherein
both fibers are attached to said thin film dichroic element at such angles with respect to planes perpendicular to the axes of said fibers that polarization effects are not approached.

15. The method according to claim 14 wherein
said angles are about twenty-five degrees.

16. The method according to claim 14 including
the step of bonding a tap off fiber or light pipe to said fiber arrangement near said thin film to collect reflected light.

17. An assembly for bidirectional optical signal transmission over a single optical fiber comprising:
   a thin film dichroic element of a thickness of less than thirty micrometers, an optical fiber attached to said element by a thin layer of adhesive.

18. An assembly as defined in claim 17 including
a second optical fiber attached to said element by a second thin layer of adhesive opposite said other fiber wherein said fibers are in optical alignment and separated only by said thin layers of adhesive and said thin film dichroic element.

19. The assembly according to claim 17 wherein
said adhesive is an optical grade epoxy of a thickness of less than twenty-five micrometers.

20. The assembly according to claim 18 wherein
said optical fiber is bonded with an optical grade epoxy in a glass substrate.

21. The assembly according to claim 20 further comprising
a tap off fiber or light pipe bonded to said glass substrate near said thin film to receive reflected light from said film.

* * * * *